United States Patent
Hirano

(10) Patent No.: US 10,901,666 B2
(45) Date of Patent: Jan. 26, 2021

(54) METHOD OF CONTROLLING INFORMATION PROCESSING DEVICE THAT RESPONDS TO SEARCH REQUEST, INFORMATION PROCESSING DEVICE, AND PROGRAM STORAGE MEDIUM

(71) Applicant: CANON KABUSHIKI KAISHA, Tokyo (JP)

(72) Inventor: Tsubasa Hirano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/596,076

(22) Filed: Oct. 8, 2019

(65) Prior Publication Data
US 2020/0133596 A1    Apr. 30, 2020

(30) Foreign Application Priority Data
Oct. 26, 2018    (JP) .................................. 2018-201903

(51) Int. Cl.
*G06F 3/12*    (2006.01)

(52) U.S. Cl.
CPC .......... *G06F 3/1226* (2013.01); *G06F 3/1205* (2013.01); *G06F 3/1286* (2013.01)

(58) Field of Classification Search
None
See application file for complete search history.

(56) References Cited

FOREIGN PATENT DOCUMENTS

JP    2009187533 A    8/2009

OTHER PUBLICATIONS

Translation for JP 2009-187533 (Year: 2009).*

* cited by examiner

*Primary Examiner* — Lennin R Rodriguezgonzalez
(74) *Attorney, Agent, or Firm* — Rossi, Kimms & McDowell LLP

(57) ABSTRACT

A control method for a device searched for by an external terminal is provided. The method includes: transmitting a first response when a searching request for a first searching protocol is received from the external terminal; and transmitting a second response when a searching request for a second searching protocol different from the first searching protocol is received from the external terminal. Each of the first and second responses includes identification information for uniquely identifying the device. The included identification information is differentiated between the first and second responses.

11 Claims, 16 Drawing Sheets

METHOD OF CONTROLLING INFORMATION PROCESSING DEVICE THAT RESPONDS TO SEARCH REQUEST, INFORMATION PROCESSING DEVICE, AND PROGRAM STORAGE MEDIUM

BACKGROUND OF THE INVENTION

Field of the Invention

The present invention relates to a method of controlling an information processing device, the information processing device, and a program storage medium.

Description of the Related Art

Systems in which information processing devices such as personal computers (PCs) search for devices (printers) connected to networks in accordance with service searching protocols included in printing services have been proposed. Examples of the printing services include web services for devices (WSD), mopria, and Airprint. As service searching protocols, WS-discovery is used for WSD and multicast DNS (mDNS) is used for mopria and Airprint.

An information processing device can search for printers supplying a printing service inside a network to which the information processing device belongs using a plurality of service searching protocols at one time. When the printers receive service searching communication, the printers transmit capability information of the printers as responses to an information terminal. The information terminal receives the capability information from the printers on the network to which the information processing device belongs, displays a list of the printers based on the capability information, allows a user to select a printer using the list of the printers, and instructs the printer to perform printing so that a document can be printed.

When the information processing device displays the list of the printers, for example, the information processing device individually displays the printers found with the service searching protocol.

Here, an information processing device that collects search results as one search result and displays the collected search results as information related to one printer when a list of printers is displayed and the plurality of search results are transmitted from one printer has been proposed. Japanese Unexamined Patent Publication No. 2009-187533 proposes an information processing device that determines that a plurality of search results related to the same device identifier is information related to physically the same printer and displays the information as information related to one printer.

SUMMARY OF THE INVENTION

According to an embodiment of the present invention, there is provided a control method for a device searched for by an external terminal. The method includes: transmitting a first response when a searching request for a first searching protocol is received from the external terminal; and transmitting a second response when a searching request for a second searching protocol different from the first searching protocol is received from the external terminal, wherein each of the first and second responses includes identification information for uniquely identifying the device, and the included identification information is differentiated between the first and second responses.

The information processing device according to the embodiment of the present invention can improve convenience when a user uses a service corresponding to a device connected to a network.

Further features of the present invention will become apparent from the following description of exemplary embodiments with reference to the attached drawings.

DESCRIPTION OF THE EMBODIMENTS

First Embodiment

In a case in which one printer is searched for in accordance with a plurality of searching methods, it is considered that a printing protocol and/or a supported printing capability used when a user selects the searched printer and actually performs printing is different. In such case, for example, there is a user who desires to perform printing in accordance with a printing method in which a supported printing capability is high and there is a user who desires to perform printing in accordance with a printing method in which printing can be intuitively used despite a supported printing capability is not high.

Accordingly, as one aspect of the embodiment, a structure is provided in which a user can flexibly select a device service in which a desired protocol is used and a device service in which a desired capability is supported on an information processing device using a device such as a printer. Hereinafter, a specific embodiment will be described with reference to the drawings.

Figure 1:
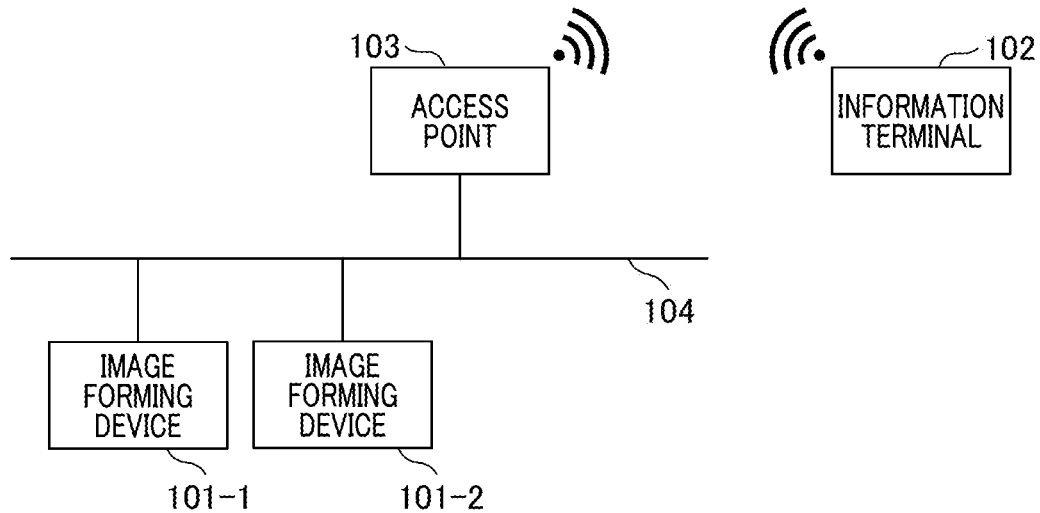
FIG. 1 is a diagram illustrating an example of a system configuration according to an embodiment of the present invention.

FIG. 1 is a diagram illustrating an example of a system configuration according to the present embodiment.

The system illustrated in FIG. 1 includes an information terminal 102 and image forming devices 101-1 and 101-2. In the following description, the image forming devices 101-1 and 101-2 are simply referred to as the image forming devices 101. The image forming device is an example of a device.

The information terminal 102 is an information processing device according to the embodiment and is connected to the image forming devices 101 via a network 104. The information terminal 102 can communicate with the image forming devices 101 on the network 104 via an access point 103 through wireless local area network (LAN) connection. The access point 103 belongs to the same network as the image forming devices 101.

The image forming device 101 is a device according to the embodiment and is, for example, a printer such as a multi-function peripheral (MFP). The image forming device 101 is connected to the network 104 via a wired LAN. For example, printer names are set in advance in the image forming devices 101. In the embodiment, a printer name of the image forming device 101-1 is set to "printer A" and a printer name of the image forming device 101-2 is set to "printer B." In the example illustrated in FIG. 1, the image forming device 101-1 supports WSD and mopria as following printing services. The image forming device 101-2 supports only WSD as a following printing service.

Figure 2:
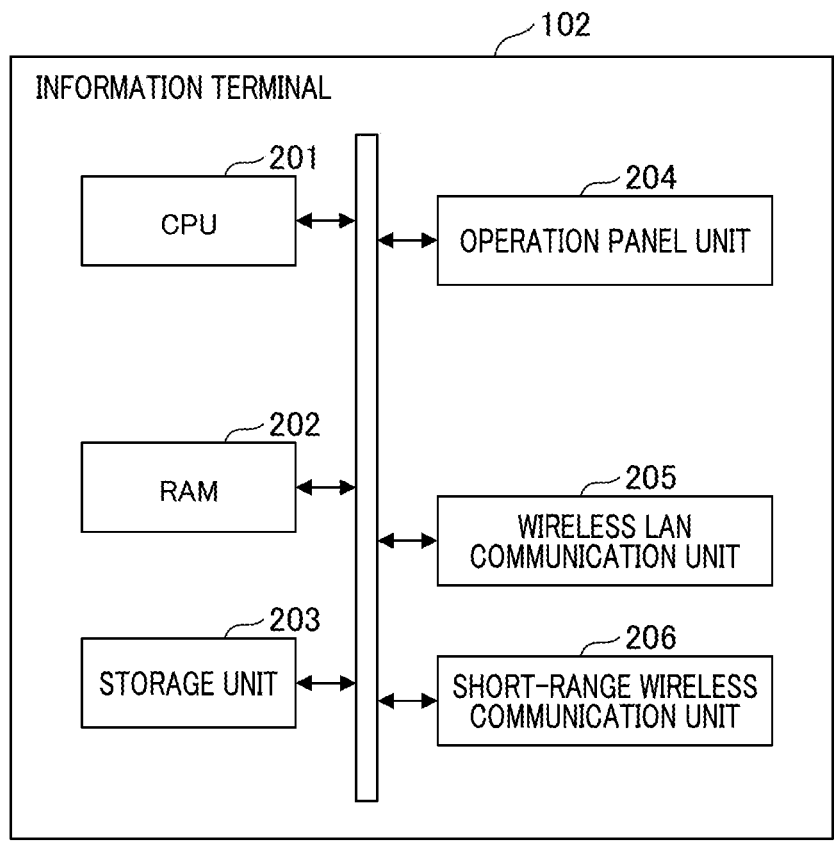
FIG. 2 is a diagram illustrating an example of a hardware configuration of an information terminal.

FIG. 2 is a diagram illustrating an example of a hardware configuration of an information terminal 102.

The information terminal 102 includes a CPU 201, a RAM 202, a storage unit 203, an operation panel unit 204, a wireless LAN communication unit 205, and a short-range wireless communication unit 206.

The CPU 201 reads a control program stored in the storage unit 203 and performs various processes to control operations of the information terminal 102. The CPU is an abbreviation for a central processing unit.

The RAM 202 is used as a temporary storage area such as a main storage area or a work area of the CPU 201. The RAM is an abbreviation for a random access memory.

The storage unit 203 stores control programs. The control programs include a printing application and a service searching program.

The operation panel unit 204 is a liquid crystal display unit that has a touch panel function. A user can operate the information terminal 102 or an application operating on the information terminal 102 using a touch panel.

The wireless LAN communication unit 205 performs wireless LAN communication with an external device such as an access point.

The short-range wireless communication unit 206 performs wireless communication with an external device located in a short range, such as NFC or Bluetooth.

Figure 3:
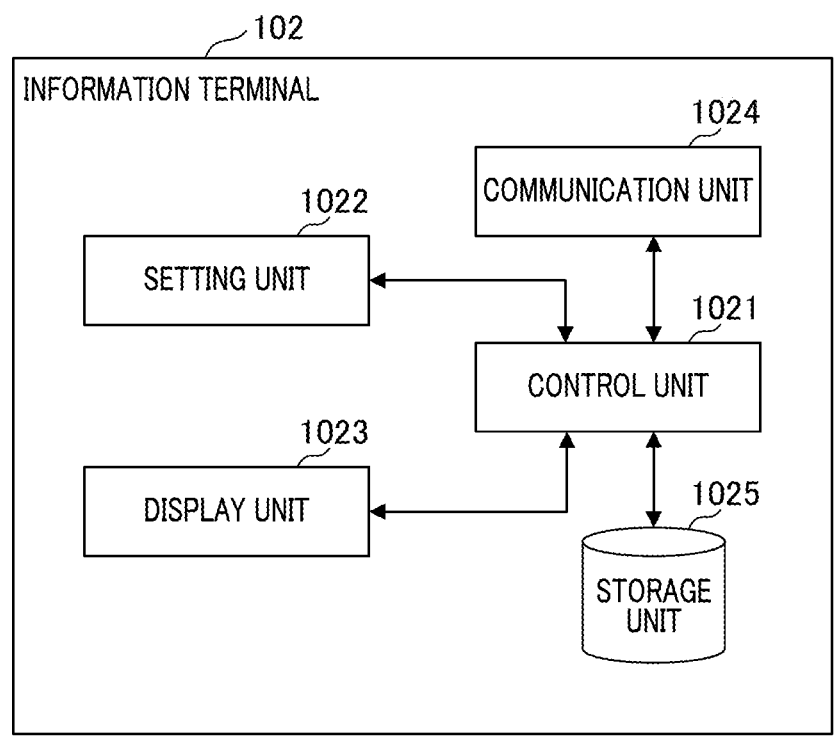
FIG. 3 is an exemplary functional block diagram illustrating the information terminal.

FIG. 3 is an exemplary functional block diagram illustrating the information terminal 102.

The information terminal 102 includes a control unit 1021, a setting unit 1022, a display unit 1023, a communication unit 1024, and a storage unit 1025. The processing units 1021 to 1025 included in the information terminal 102 are realized when the CPU 201 executes a control program.

The control unit 1021 controls the entire information terminal 102.

The setting unit 1022 performs various kinds of setting in response to instructions from the control unit 1021.

The display unit 1023 displays various kinds of data in response to instructions from the control unit 1021.

The communication unit 1024 performs communication with an external device in response to an instruction from the control unit 1021. For example, the control unit 1021 transmits a service searching packet to the network 104 via the communication unit 1024. In the following description, the service searching packet is simply referred to as a searching packet.

The searching packet is a packet used for a searching request to search printers (the image forming devices 101) supplying services. The searching request is performed by transmitting the searching packet. Searching packets are generated and transmitted for each service searching protocol corresponding to the information terminal 102.

The storage unit 1025 stores various kinds of data in response to instructions from the control unit 1021.

Figure 4:
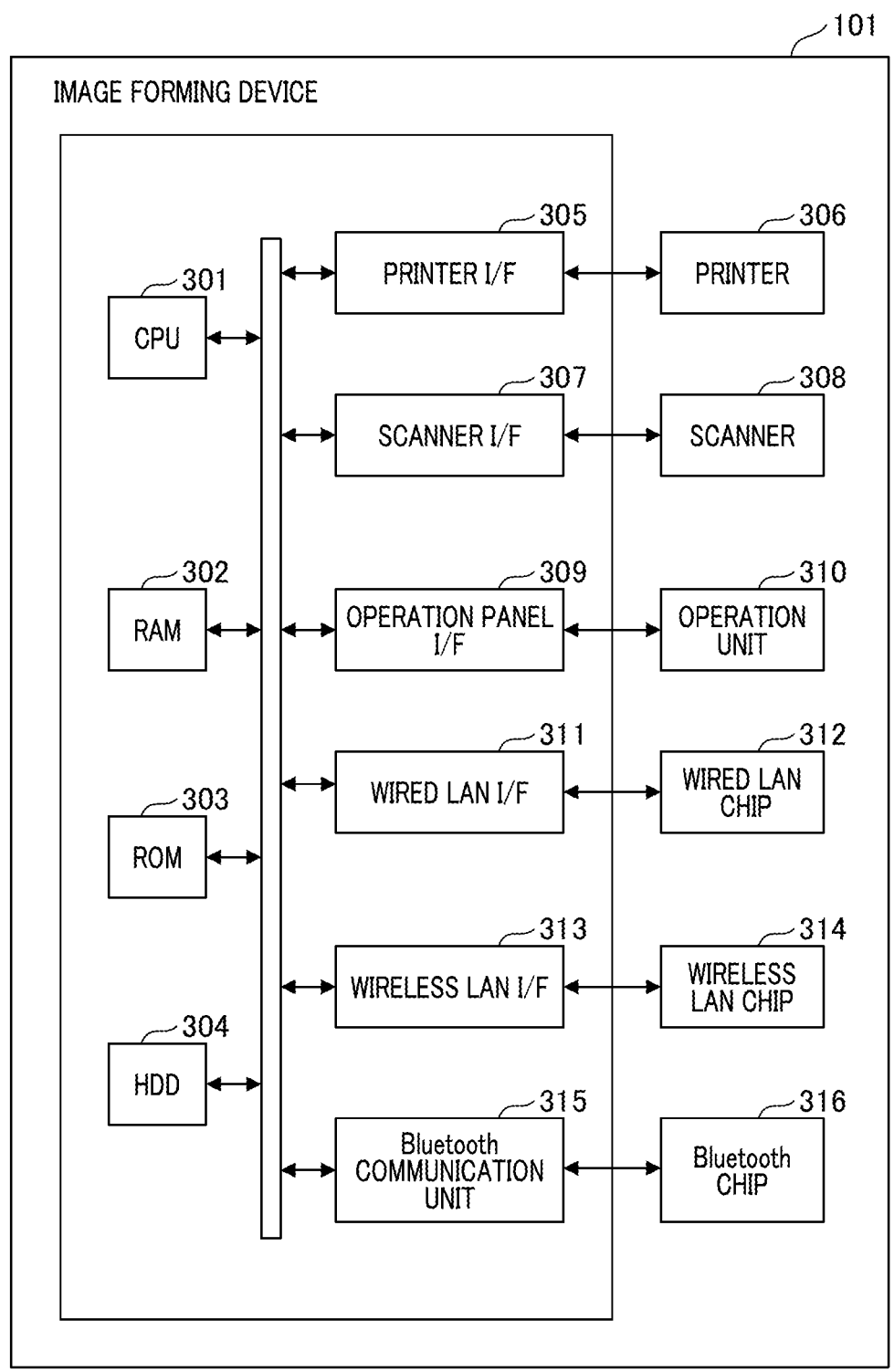
FIG. 4 is a diagram illustrating an example of a hardware configuration of an image forming device.

FIG. 4 is a diagram illustrating an example of a hardware configuration of the image forming device 101.

The CPU 301 reads a control program stored in the storage unit 303 and performs various processes to control operations of the image forming device 101.

The RAM 302 is used as a temporary storage area such as a main memory area or a work area of the CPU 301.

The ROM 303 stores control programs. The ROM is an abbreviation for a read-only memory.

The HDD 304 stores various kinds of data such as printing data and scanned images. The HDD is an abbreviation for a hard disk drive.

The printer 306 performs a printing process on a sheet based on printing data received from an external device or a scanned image generated by the scanner 308. The CPU 301 instructs the printer 306 to perform a printing process via a printer interface (I/F) unit 305.

The scanner 308 scans a document in response to an instruction from the CPU 301 via the scanner I/F unit 307, thereby generating a scanned image. The generated scanned image is stored in the printer 306 or is stored in the HDD 304.

The operation unit 310 includes a keyboard or a liquid crystal display unit that has a touch panel function. The operation unit 310 displays various kinds of data in response to instructions from the CPU 301 via the operation panel I/F unit 309. The user can input an instruction and information to the image forming device 101 via the operation unit 310.

The wired LAN I/F unit 311 performs wired LAN communication with an external device via a LAN chip 312.

A wireless LAN I/F unit 313 performs wireless LAN communication with an external device such as an access point via a wireless LAN chip 314.

A Bluetooth communication unit 315 performs wireless communication with an external device located in a short range via a Bluetooth chip 316.

Figure 5:
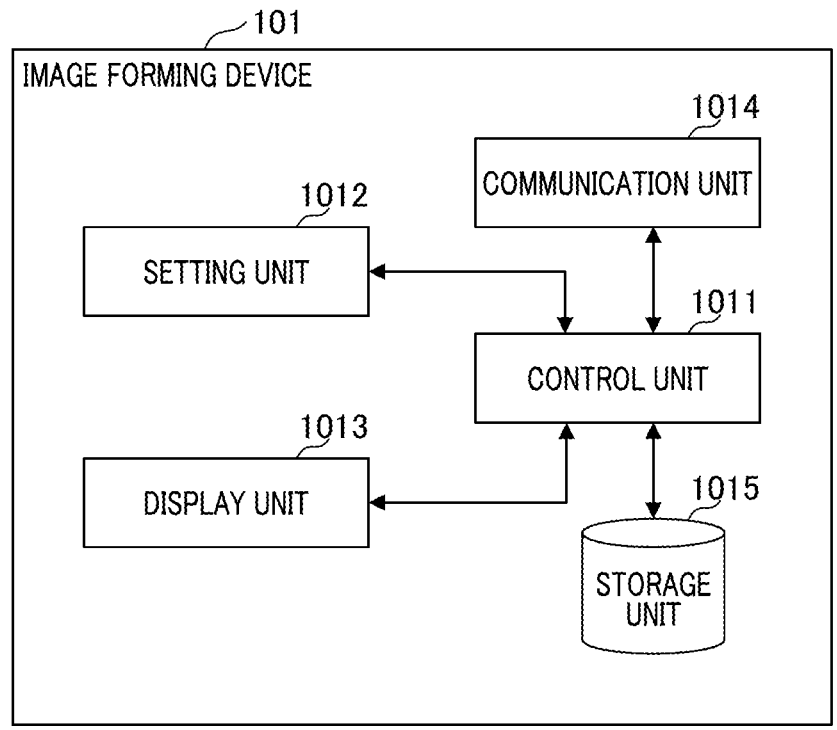
FIG. 5 is an exemplary functional block diagram illustrating the image forming device.

FIG. 5 is an exemplary functional block diagram illustrating the image forming device 101.

The image forming device 101 includes a control unit 1011, a setting unit 1012, a display unit 1013, a communication unit 1014, and a storage unit 1015. Each processing unit included in the image forming device 101 is realized when the CPU 301 executes a control program.

The control unit 1011 controls the entire image forming device 101.

The setting unit 1012 performs various kinds of setting in response to an instruction from the control unit 1011.

The display unit 1013 displays various kinds of data in response to instructions from the control unit 1011.

The communication unit 1014 performs communication with an external device in response to an instruction from the control unit 1011. For example, the communication unit 1014 receives a searching packet transmitted by the information terminal 102 and the control unit 1011 generates a response in accordance with the searching packet. A response is generated for each service indicated by a service searching protocol corresponding to the searching packet. The communication unit 1014 responds to the image forming device 101 with the generated response.

The storage unit 1015 stores various kinds of data in response to instructions from the control unit 1011.

Figure 6:
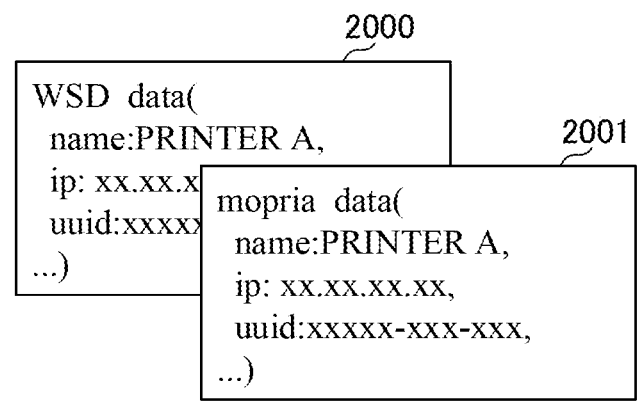
FIG. 6 is a diagram illustrating an example of a response made by the image forming device.

FIG. 6 is a diagram illustrating an example of a response made by the image forming device 101 in response to a searching packet.

As described above, the image forming device 101-1 supports WSD and mopria as following printing services. Accordingly, the image forming device 101-1 responds with a response 2000 corresponding to WSD and a response 2001 corresponding to mopria. Each response includes information for identifying a service searching protocol, a printer name, an IP address, and a device identifier (identification information). In the embodiment, a universally unique identifier (UUID) is used as a device identifier.

Figure 7:
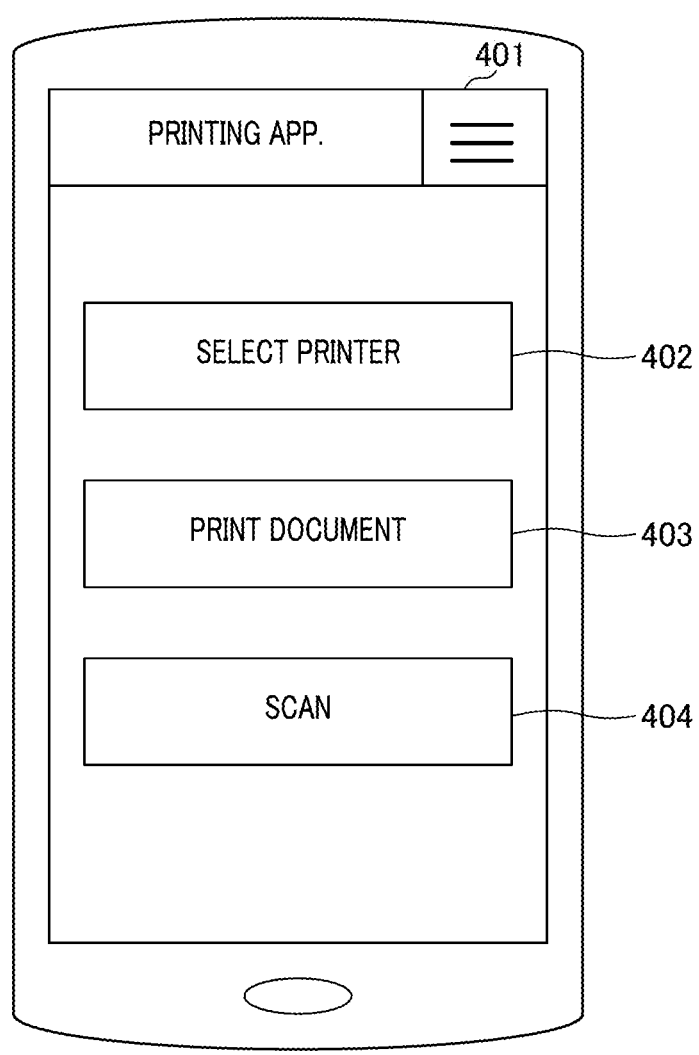
FIG. 7 is a diagram illustrating an example of a printing application screen.

FIG. 7 is a diagram illustrating an example of a printing application screen displayed by the information terminal 102.

The printing application screen is a screen that is displayed at the time of activation of a printing application. A setting button 401 is a button used to perform setting or the like of an application. When a user taps the setting button 401, the setting screen is opened. The user can perform setting necessary for communication with the image forming device 101 or browse help information for using the printing application using the setting screen.

A printer selection button 402 is a button used to select a printer (the image forming device 101). When the user taps the printer selection button 402, the control unit 1021 searches for printers on the network to which the information terminal 102 belongs, and instructs the display unit 1023 (see FIG. 3) to display a list of the searched printers. The user can select a printer to be used for printing or scanning from the displayed list.

A document printing button 403 is a button used to print a document inside the information terminal 102. When the user taps the document printing button 403, the user can select a document inside the information terminal 102 and perform print setting such as the number of copies, or color or monochrome. Thereafter, when the user gives a printing instruction to an application, communication can be performed with the image forming device 101 selected with the printer selection button 402 and the selected document can be printed.

A scan button 404 is a button used to store an image scanned and acquired by the image forming device 101 in the information terminal 102. When the user taps the scan button 404, the printing application transmits a scan instruction to the image forming device 101. When the image forming device 101 receives the scan instruction, the image forming device 101 operates the scanner 308 via the scanner I/F unit 307 to scan a document set in the scanner 308. The image forming device 101 transmits an image acquired through the scanning to the information terminal 102. The information terminal 102 receives the image from the image forming device 101 and stores the image in the storage unit 1025.

Figure 8:
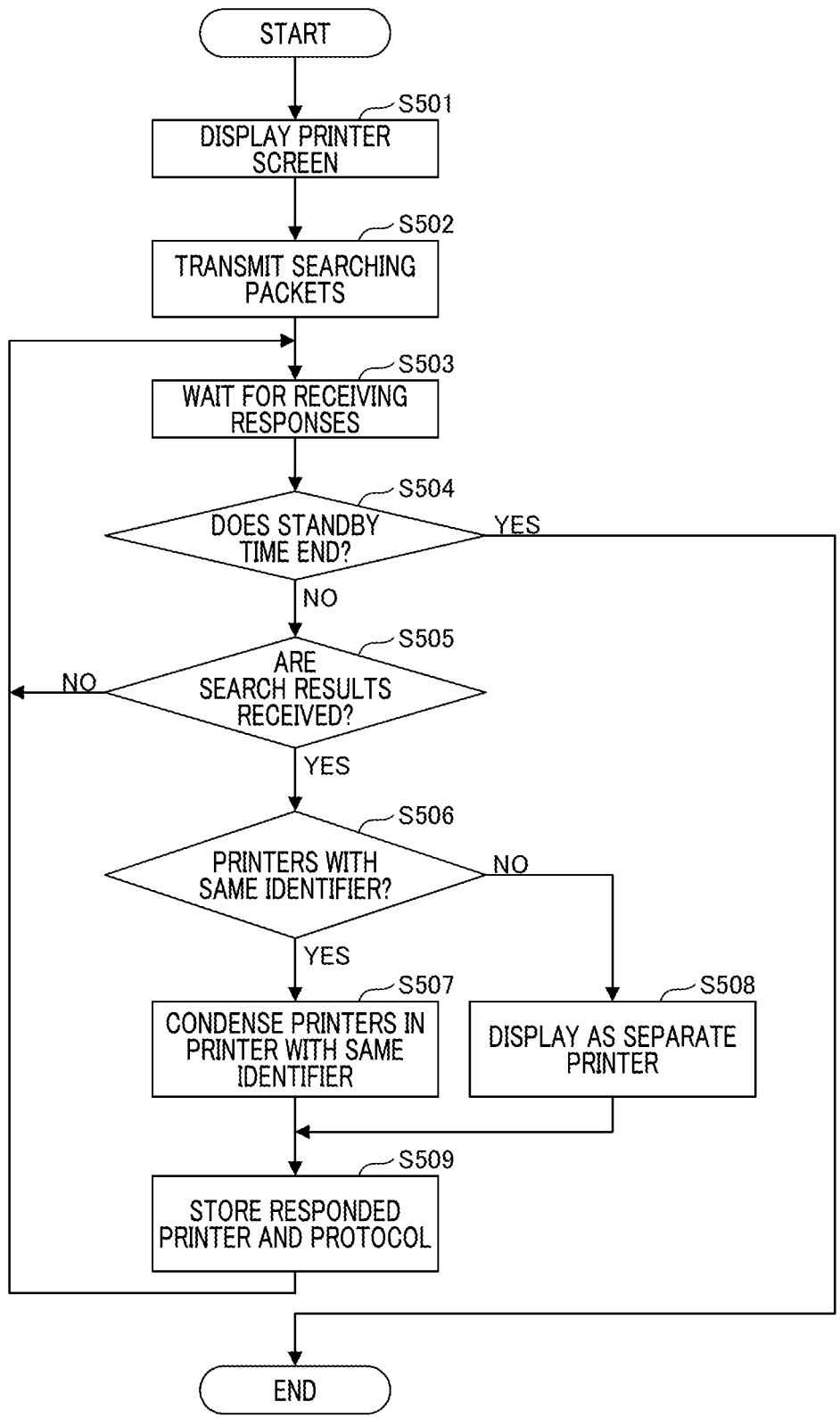
FIG. 8 is a flowchart illustrating an operation process of the information terminal.

FIG. 8 is a flowchart illustrating an operation process of the information terminal 101 according to the first embodiment.

An operation illustrated in FIG. 8 starts when the user presses the printer selection button 402 on the printing application screen in FIG. 7. The operation illustrated in FIG. 8 is realized when the control unit 1021 performs the printing application.

In S501, the printing application displays a printer selection screen. In this stage, since printers have not yet been found, a list of printers is not displayed.

Subsequently, in S502, the printing application transmits service searching packets using all of the corresponding searching protocols.

Subsequently, in S503, the printing application proceeds to a state in which the printing application waits for receiving responses to the searching packets transmitted in S502 from the printers.

Subsequently, in S504, the printing application determines whether a standby time determined in advance ends. When the standby time ends, the printing application ends the printer searching process and waits for a subsequent operation of the user. When the standby time does not end, the process proceeds to S505.

In S505, the printing application determines whether the responses to the searching packets, that is, search results, are received. When the printing application does not receive the responses, the process returns to S503. When the printing application receives the responses, the process proceeds to S506.

In S506, the printing application determines whether there are printers with the same UUID. Specifically, the printing application determines whether the UUID included in the responses is the same as the UUID of the acquired printers. When the UUID included in the responses is the same as the UUID of the acquired printers, the printing application determines that there are the printers with the same UUID. The UUID is a device identifier (identification information) for identifying the image forming device 101. The presence of the printers with the same UUID means that the responses include the plurality of same UUIDs. When there are the printers with the same UUID, the process proceeds to S507. When there are no printers with the same UUID, the process proceeds to S508.

Figure 9B:
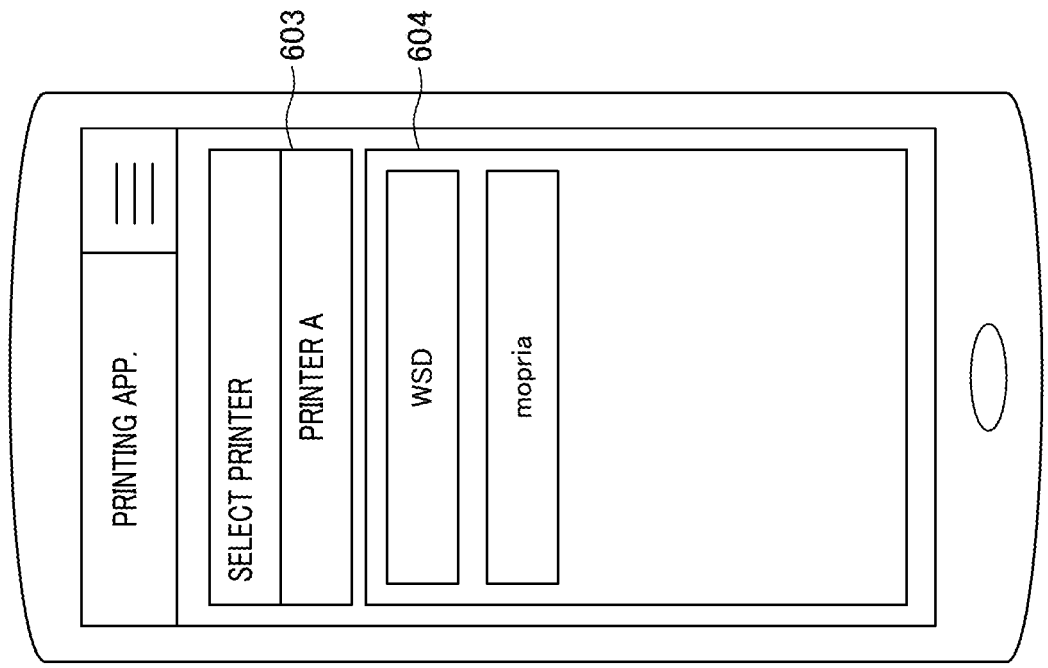
FIGS. 9A and 9B are diagrams illustrating examples of screens displayed by a printing application.
Figure 9A:
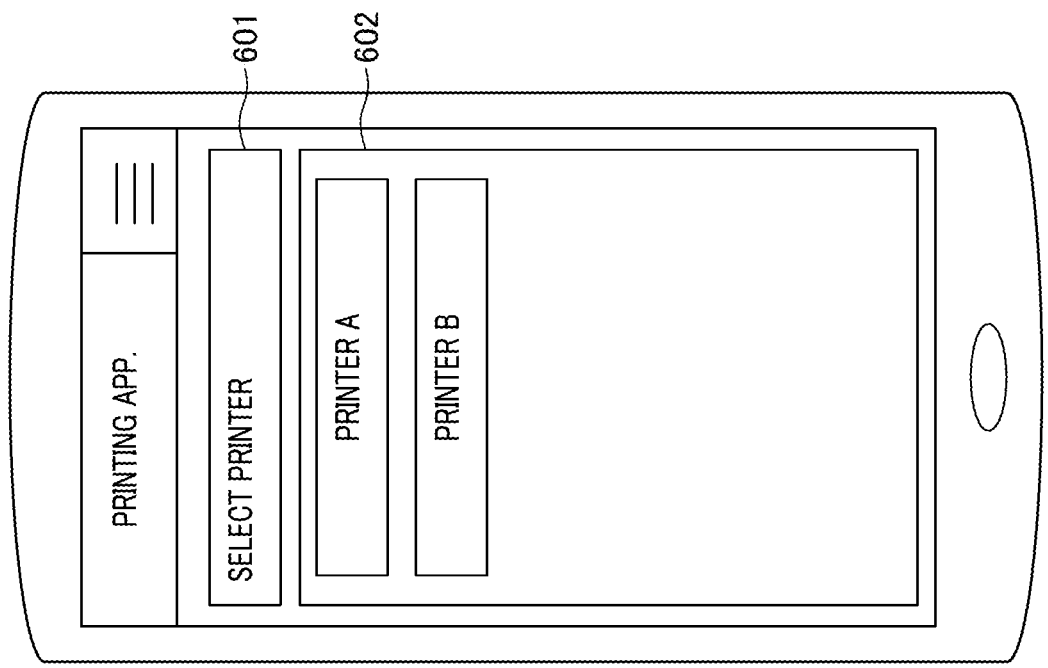

In S507, the printing application condenses the printers with the same UUID into one printer and displays the printer on a printer selection screen (a first screen) illustrated in FIG. 9A. That is, when the same UUID is included in the plurality of responses, the printing application displays only one device on the first screen with regard to the UUID. For example, the image forming device 101-1 supporting WSD and mopria responds with responses 2000 and 2001 illustrated in FIG. 6. The UUIDs included in the two responses are the same. Accordingly, the printing application displays only one printer (printer A) on the printer selection screen with regard to the UUID. As long as the UUIDs included in the responses are the same, the number of printers in a printer list on the printer selection screen does not increase.

Conversely, when there are no printers with the same UUID, the printing application determines that a new printer is found. Accordingly, in S508, the new printer is displayed as a separate printer on the printer selection screen illustrated in FIG. 9A. For example, the image forming device 101-2 supports only WSD as a printing service. Accordingly, there is no UUID which is the same as the UUID included in the response from the image forming device 101-2. As a result, the printing application displays printer B as a separate printer on the printer selection screen. Subsequently, in S509 of FIG. 8, the printing application stores information included in the response (information regarding the service searching protocol and the UUID of the printer). Then, the process returns to S503.

FIGS. 9A and 9B are diagrams illustrating examples of screens displayed by a printing application.

FIG. 9A illustrates a printer screen on which the printer selection button 402 is pushed and the printing application is displayed at a time point at which the printer searching process in accordance with the process of the flowchart in FIG. 8 ends.

A title display portion 601 is that a displayed screen is the printer selection screen.

A printer list 602 is a region in which a list of the printers searched for through the printer searching process is displayed. In the example illustrated in FIG. 9A, "printer A" and "printer B" which are the printer names of the image forming devices 101-1 and 101-2 are displayed in the printer list 602. The image forming device 101-1 in which the UUIDs included in the responses to the searching packets are the same is displayed as one printer (printer A).

When the user selects (taps) the printer on the printer selection screen (the first screen) in FIG. 9A, the printing application performs the following process.

Based on the information stored in S509 of FIG. 8, the printing application determines whether the number of services corresponding to the selected printer is plural. When the number of services corresponding to the selected printer is plural, the printing application displays each service on a printer selection screen (a second screen) illustrated in FIG. 9B. That is, the printer selection screen illustrated in FIG. 9A transitions to the printer selection screen illustrated in FIG. 9B.

For example, printing services supported by printer A are two printing services: WSD and mopria. Accordingly, when printer A is selected on the printer selection screen illustrated in FIG. 9A, the printing application displays the printing services corresponding to printer A on the printer selection screen in FIG. 9B.

A title 603 indicates that the printer selection screen in FIG. 9B is a printer selection screen on which a list of the printing services corresponding to printer A is displayed.

A printing service list 604 is a list of the printing services corresponding to printer A and found through the service searching of the information terminal 102. In the example illustrated in FIG. 9B, WSD and mopria which are the printing services corresponding to printer A are displayed in the printing service list 604.

When the user selects the printing services displayed in the printing service list 604, printer A (the image forming device 101-1) is selected as a printer to be used and a printing service to be used (a service in which WSD is used as protocol or a service in which mopria is used as protocol) is selected. Then, since printer A is selected, the printing application stores capability information of printer A. As a result, when a document is printed or scanned, printer A is used with a protocol of a printing service selected on the printing service list 604.

A case in which printer B is selected on the printer selection screen illustrated in FIG. 9A is assumed. The printing service corresponding to printer B is one printing service: WSD. Accordingly, the printing application stores the capability information of printer B without causing the printer selection screen to transition to the printer selection screen illustrated in FIG. 9B. Then, when a document is printed or scanned, printer B is used with a protocol of the printing service corresponding to printer B selected on the printer selection screen in FIG. 9A.

As understood from the above description, the control unit 1021 (see FIG. 3) instructs the printer to perform printing with the protocol of the service determined based on the selection of the printer on the first screen or the selection of the service on the second screen.

Second Embodiment

Hereinafter, a second embodiment of the present invention will be described. A system configuration according to the embodiment is similar to the case (see FIG. 1) of the above-described first embodiment. A hardware configuration and a software configuration of the image forming devices 101 and the information terminal 102 are also similar to the case (see FIGS. 2 to 5) of the above-described first embodiment except for the following points.

Figure 10:
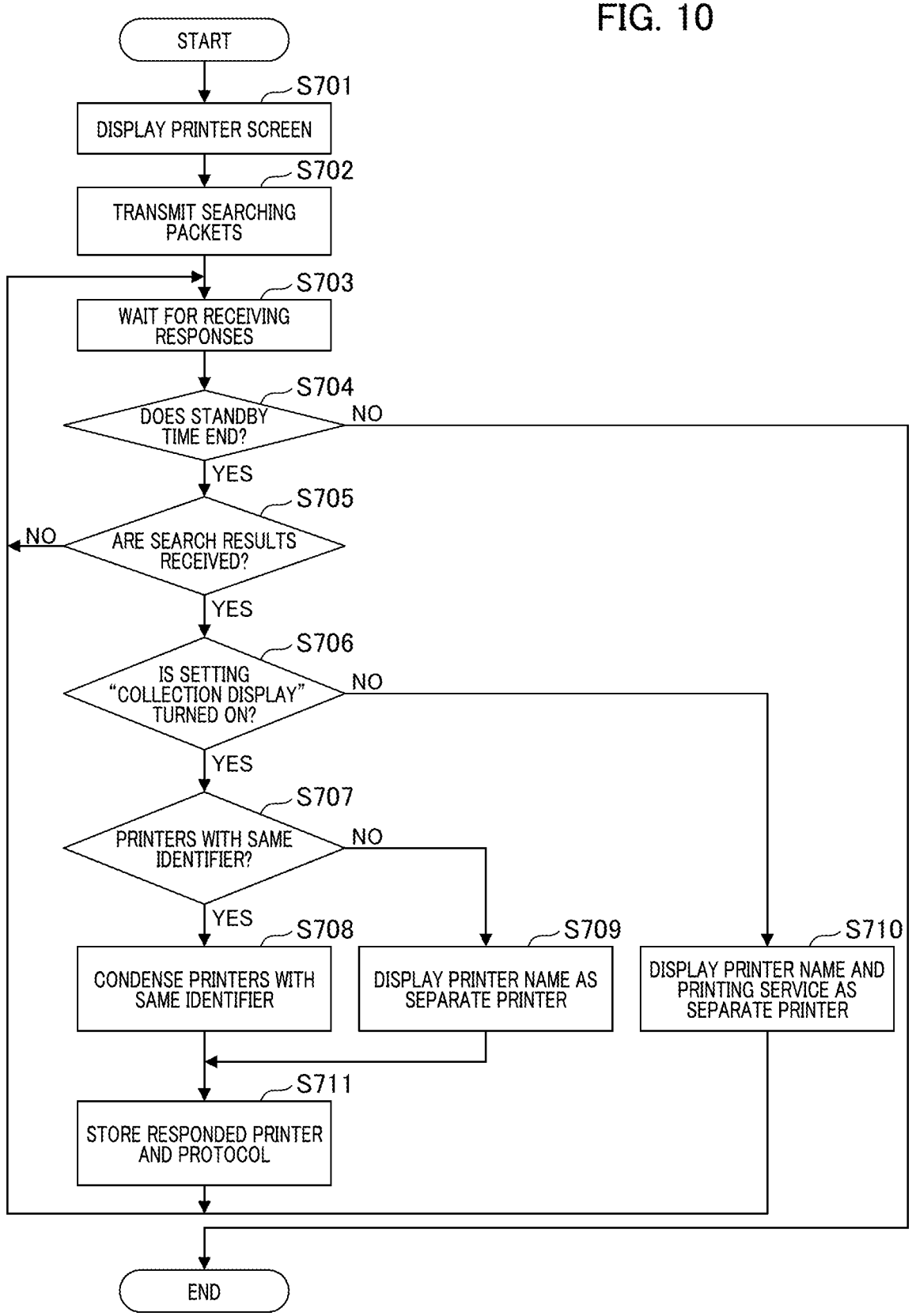
FIG. 10 is a flowchart illustrating an operation process of the information terminal.

FIG. 10 is a flowchart illustrating an operation process of the information terminal 102 according to the second embodiment.

An operation illustrated in FIG. 10 is realized when the control unit 1021 performs the printing application. S701 to S705 are similar to S501 to S505 of FIG. 8. S707, S708, S709, and S711 are similar to S506, 507, S508, and S509 of FIG. 8, respectively. That is, the embodiment is different from the above-described first embodiment in that S706 and S710 are added as an operation process of the information terminal 102.

In S706, the printing application determines whether setting "collection display" is turned on as predetermined display setting. The setting "collection display" is setting in which a plurality of printing services corresponding to a plurality of same UUIDs are displayed as a printing service related to one printer on the printer selection screen when the same UUIDs are included in the responses to the searching packets.

Figure 11:
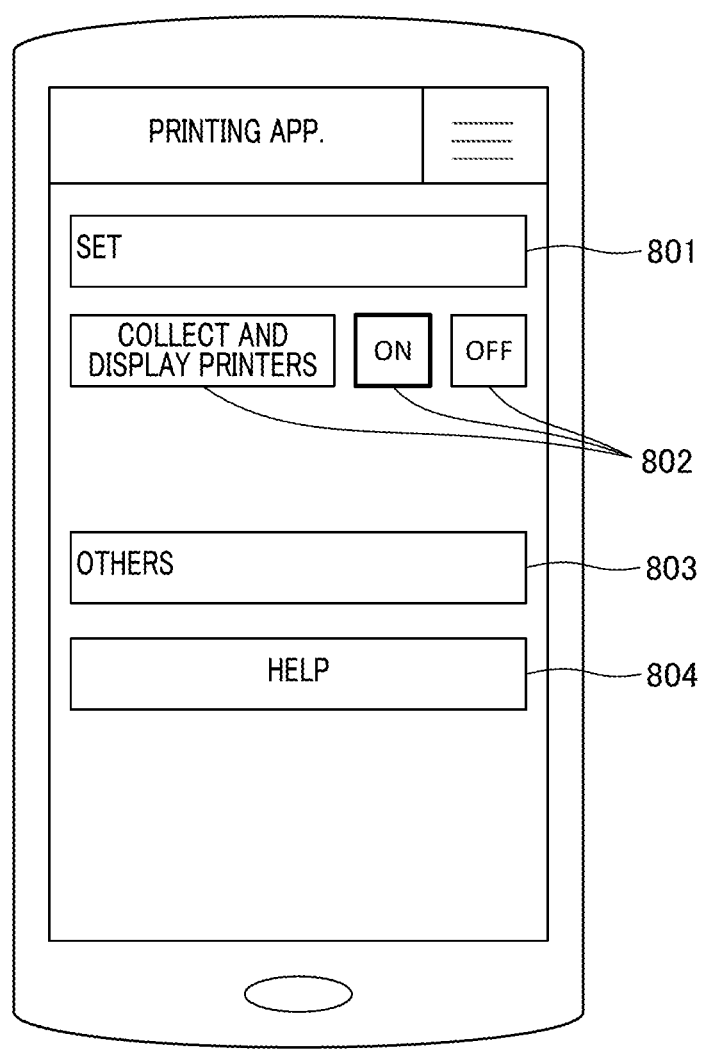
FIG. 11 is a diagram illustrating an example of a setting screen used for display setting.

FIG. 11 is a diagram illustrating an example of a setting screen used for display setting by the printing application.

When the user taps the setting button 401 in FIG. 7, the printing application displays the setting screen.

A title display unit 801 indicates that a display screen is a setting screen.

A setting portion 802 is used to turn the setting "collection display" on or off.

Other display portions 803 are used to perform setting other than the display setting.

A help button 804 is used to display a help menu related to, for example, an operation.

FIG. 10 is referred to for description. When the setting "collection display" is performed, the process proceeds to S707. When the setting "collection display" is not performed, the process proceeds to S710.

In S710, the printing application displays the printer name and the printing service as the separate printer on the printer selection screen. Then, the process returns to S703.

Figure 12:
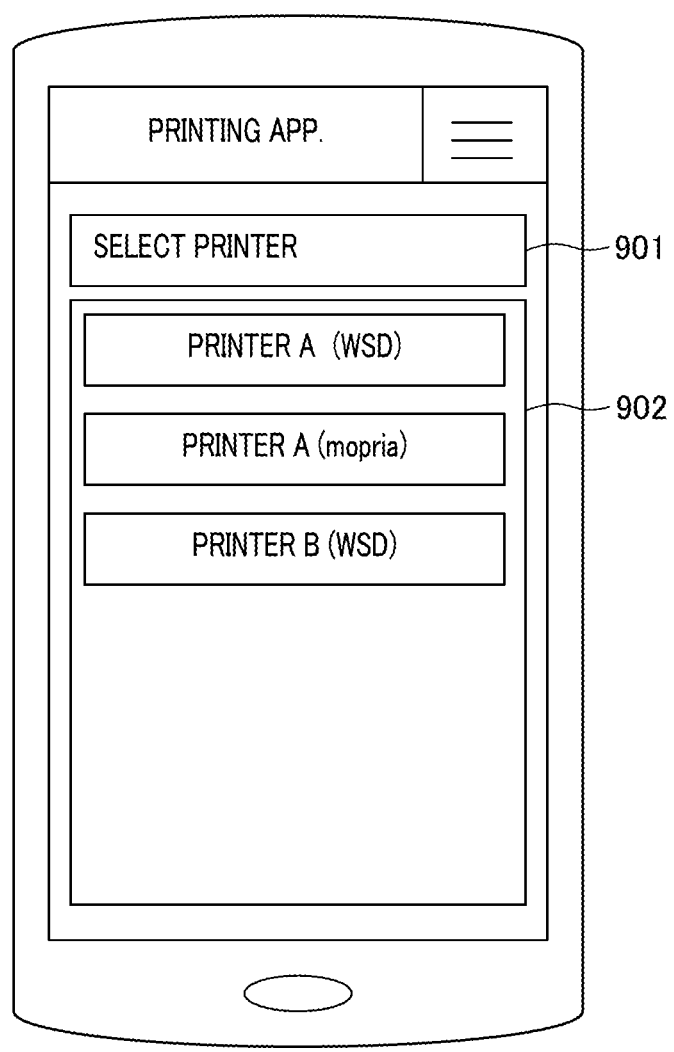
FIG. 12 is a diagram illustrating an example of a printer selection screen.

FIG. 12 is a diagram illustrating an example of a printer selection screen displayed in the process of S710 of FIG. 10.

A title display portion 901 indicates that a displayed screen is a printer selection screen. A printer list 902 indicates a region in which a list of printers searched for through the printer searching process is displayed.

In the example illustrated in FIG. 12, a case is assumed in which, as responses to the searching packets, the image forming device 101-1 returns responses corresponding to WSD and mopria and the image forming device 101-2 returns a response corresponding to WSD. In this case, the printing application displays each of printer A (WSD), printer A (mopria), and printer B (WSD) as a separate printer. In other words, the printing application displays a device name (printer name) and a service of the device corresponding to the UUID for each service included in the response to the searching packet.

When the user taps a button of a desired printer, the printer and the printing service to be used are selected and capability information of the printer is stored. When a document is printed or scanned, the printer is used with the protocol of the printing service corresponding to the printer selected on the printer selection screen of FIG. 12.

Third Embodiment

Hereinafter, a third embodiment of the present invention will be described. A system configuration according to the embodiment is similar to the case (see FIG. 1) according to the above-described first embodiment. A hardware configuration and a software configuration of the image forming devices 101 and the information terminal 102 are also similar to the case (see FIGS. 2 to 5) of the above-described first embodiment except for the following points.

The third embodiment relates to an operation of the image forming device 101 that responds to a searching packet from the information terminal 102. In the embodiment, the image forming device 101-1 uses a different device identifier for each printing service.

Figure 13:
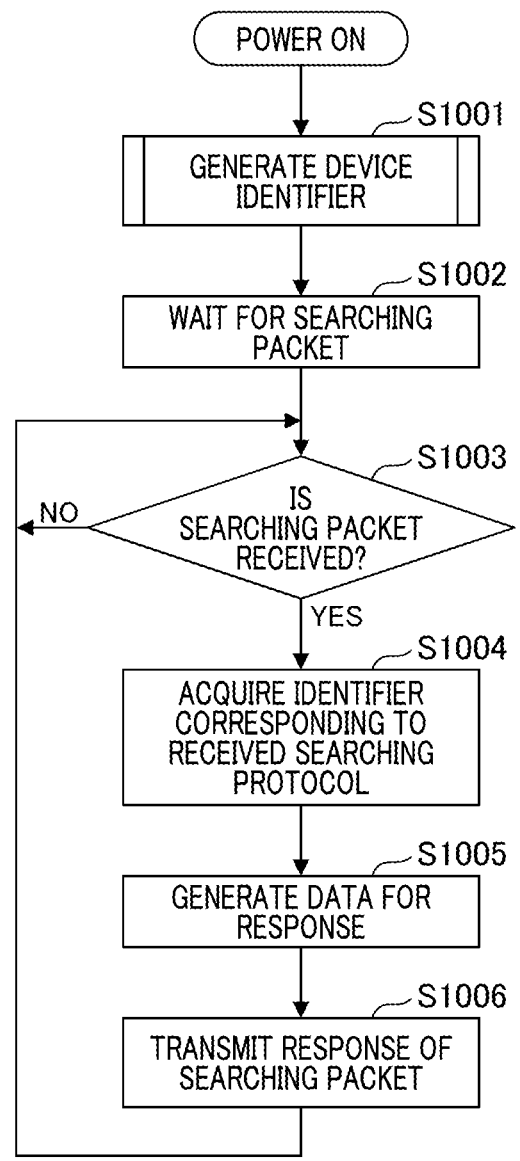
FIG. 13 is a flowchart illustrating an operation process of the image forming device.

FIG. 13 is a flowchart illustrating an operation process of the image forming device 101 according to the third embodiment.

An operation illustrated in FIG. 13 is realized when the control unit 1011 (see FIG. 5) executes the control program.

When power is fed to the image forming device 101, the process starts. In S1001, the control unit 1011 generates a device identifier to be used for a response to a searching packet. In this example, a UUID is assumed to be used as the device identifier.

Subsequently, in S1002, the control unit 1011 starts waiting for the searching packet.

Subsequently, in S1003, the control unit 1011 determines whether the searching packet is received. When the control unit 1011 determines that the searching packet is received, the process proceeds to S1004. When the control unit 1011 determines that the searching packet is not received, the process returns to S1003.

In S1004, the control unit 1011 acquires the UUID corresponding to the service searching protocol used for the received searching packet.

Subsequently, in S1005, the control unit 1011 generates data responding to the searching packet. The control unit 1011 includes the UUID acquired in S1004 and information indicating the printing service corresponding to the image forming device 101 in the data.

Then, in S1006, the control unit 1011 transmits the response including the data generated in S1005 to the information terminal 102. Then, the process returns to S1003.

As described above, conventionally, there is known the information terminal 102 configured to collect a plurality of printing services as one printing service and display the printing service as information related to one image forming device 101 when information regarding the printing services from one image forming device 101 is transmitted as a response. As described above, in the related art, although the image forming device 101 has a capability to supply the plurality of kinds of printing services, the information terminal 102 can select only one printing service among the printing services.

In the embodiment, however, the control unit 1011 has a function of setting a different UUID to be used for each printing service of the image forming device 101 when responding. Accordingly, even when the information terminal 102 cannot help collecting and displaying a plurality of printing services corresponding to one UUID as one printing service, the user can select a desired printing service from the plurality of printing services supplied by the same image forming device 101.

Figure 14B:
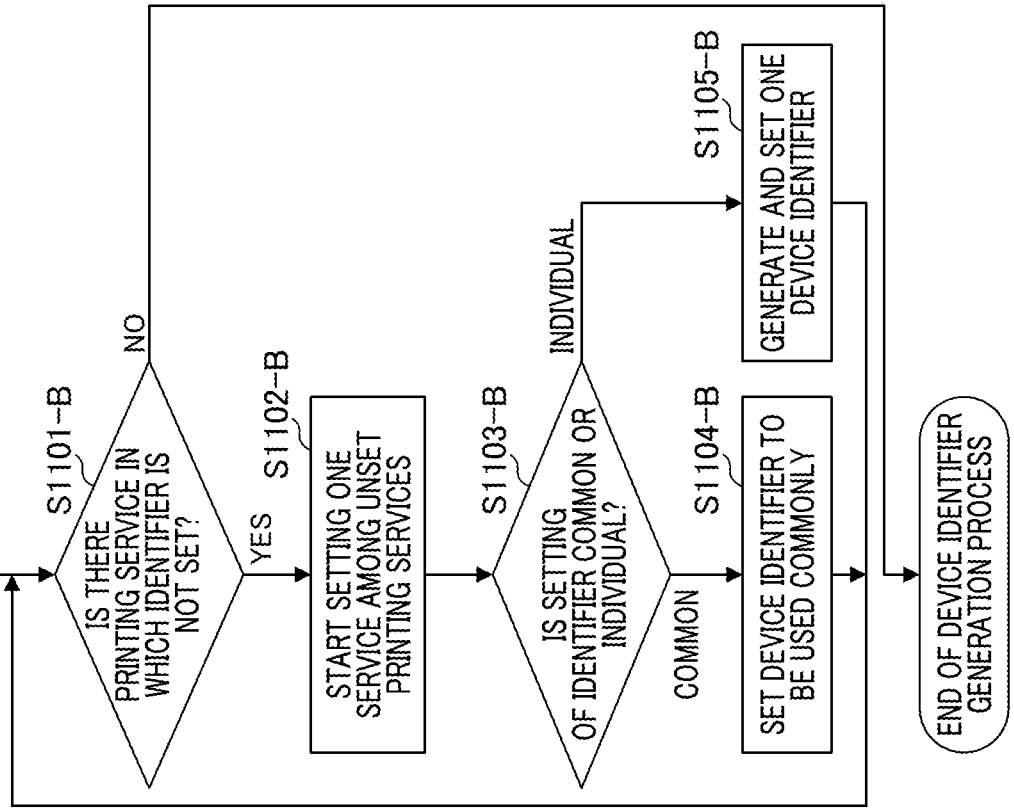
FIGS. 14A and 14B are flowcharts illustrating processes of generating device identifiers.
Figure 14A:
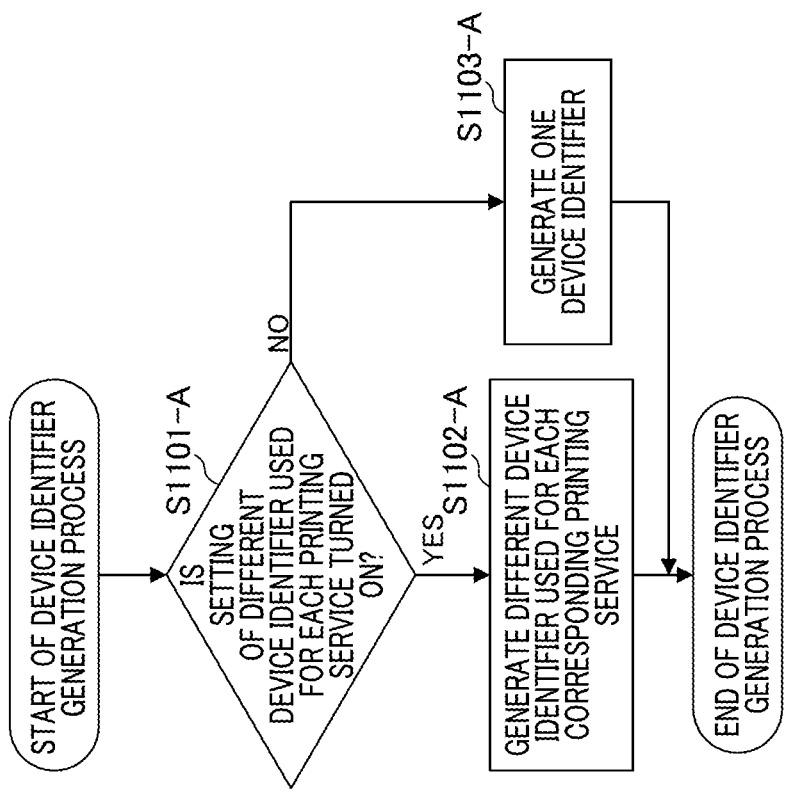

FIG. 14A is a flowchart illustrating a process of generating the UUID in S1001 of FIG. 13.

In S1101-A, the control unit 1011 determines whether the image forming device 101 is set so that a different UUID is used for each printing service. When each printing service is set to use different UUID, the process proceeds to S1102-A. When each printing service is set not to use different UUID, the process proceeds to S1103-A.

Figure 16:
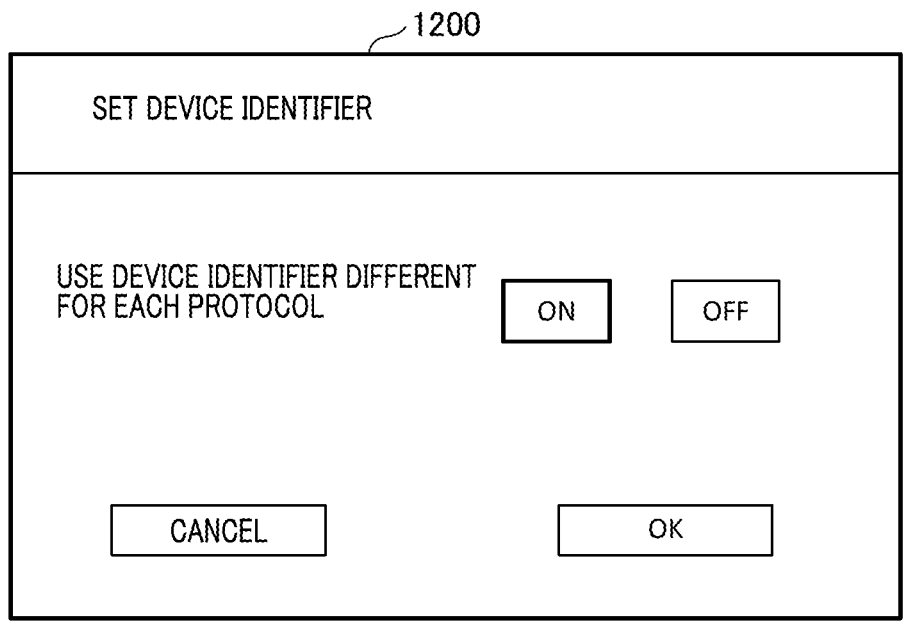
FIG. 16 is a diagram illustrating a setting screen for performing setting related to a device identifier.

FIG. 16 is a diagram illustrating a setting screen for performing setting related to the UUID used for a printing service according to the embodiment.

When the user sets to turn on an item "Use device identifier different from each protocol" on the setting screen 1200 in FIG. 16, the image forming device 101 is set so that the device identifier (UUID) different for each printing service is used.

When the item "Use device identifier different from each protocol" is set to be off, the image forming device 101 is set so that the device identifier different for each printing service is not used and one device identifier common to all the printing services is used.

FIG. 14A is referred to for description. In S1102-A, the control unit 1011 generates a different device identifier (UUID) for each printing service supported by the self-device (the image forming device 101). Then, the process ends.

Conversely, in S1103-A, the control unit 1011 generates one device identifier (UUID) common to all the printing services. Then, the process ends.

The control unit 1011 may display the UUID generated in S1102-A or S1103-A on the screen.

Fourth Embodiment

Hereinafter, a fourth embodiment of the present invention will be described. A system configuration according to the embodiment is similar to the case (see FIG. 1) according to the above-described first embodiment. A hardware configuration and a software configuration of the image forming devices 101 and the information terminal 102 are also similar to the case (see FIGS. 2 to 5) of the above-described first embodiment except for the following points.

In the fourth embodiment, whether to use a device identifier common to different printing services or use an individual device identifier can be set for each printing service as the device identifier (UUID) used for the printing service.

Figure 17:
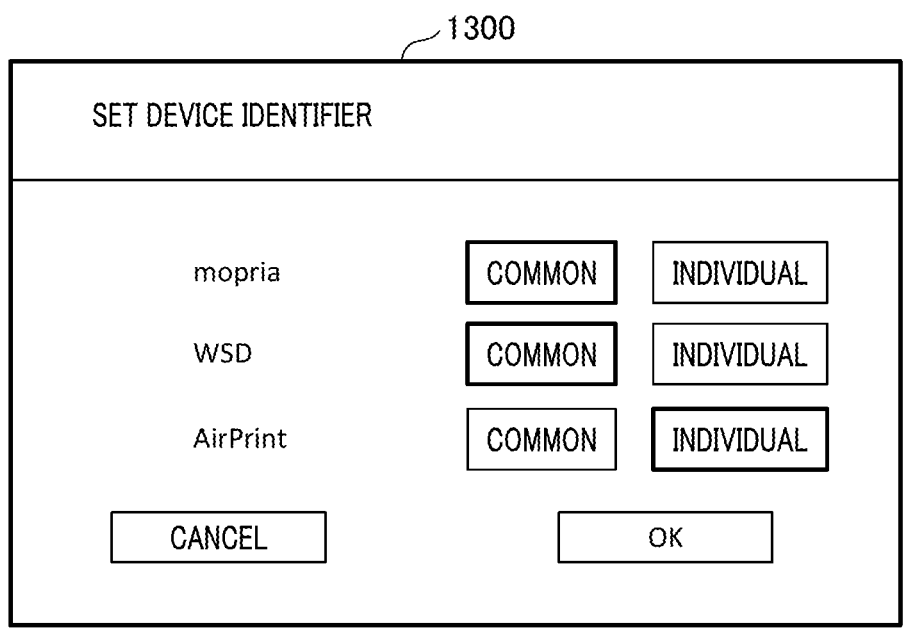
FIG. 17 is a diagram illustrating a setting screen for performing setting related to a device identifier.

FIG. 17 is a diagram illustrating a setting screen for performing setting related to a device identifier used for the printing service according to the fourth embodiment. In response to an operation by the user on the setting screen 1300 in FIG. 17, the control unit 1011 selects "common" or "individual" for each printing service corresponding to the image forming device 101.

For the printing service for which "common" is selected, the control unit 1011 allocates a device identifier determined in advance as a common device identifier.

For the printing service for which "individual" is selected, the control unit 1011 allocates an individual device identifier.

When an OK button in FIG. 17 is pushed, the setting is stored and reflected in the process. When a cancel button is pushed, the setting is not stored and the process is performed using the previous setting.

FIG. 14B is a flowchart illustrating a process of generating the device identifier by the image forming device 101 according to the fourth embodiment.

In S1101-B, the control unit 1011 determines whether there is a printing service in which the device identifier is not set. When there is no printing service in which the device identifier is not set, the process ends. When there is the printing service in which the device identifier is not set, the process proceeds to S1102-B.

In S1102-B, the control unit 1011 starts setting one printing service among the printing services in which the device identifier is not set.

Subsequently, in S1103-B, the control unit 1011 determines whether the setting of the device identifier used for the printing service is "common" or "individual." When the setting of the device identifier used for the printing service is "common," the process proceeds to S1104-B. When the setting of the device identifier used for the printing service is "individual," the process proceeds to S1105-B.

In S1104-B, the control unit 1011 allocates the device identifier (UUID) common to all the printing services set to be "common" as the device identifier. Then, the process returns to S1101-B. The device identifier used for being common may be generated in advance or may be generated in S1104-B.

In S1105-B, the control unit 1011 generates and sets one individual device identifier (UUID) as the device identifier used for the printing service. In S1105-B, the same device identifier is generated for the same printing service irrespective of a generation timing of the device identifier. Thereafter, the process returns to S1101-B. The control unit 1011 may display the UUID set in S1104-B or S1105-B on the screen.

Fifth Embodiment

Hereinafter, a fifth embodiment of the present invention will be described. A system configuration according to the embodiment is similar to the case (see FIG. 1) according to the above-described first embodiment. A hardware configuration and a software configuration of the image forming devices 101 and the information terminal 102 are also similar to the case (see FIGS. 2 to 5) of the above-described first embodiment except for the following points.

In the fifth embodiment, it can be selected whether to set identification information designated by a user for each printing service as the device identifier used for the printing service.

Figure 18A:
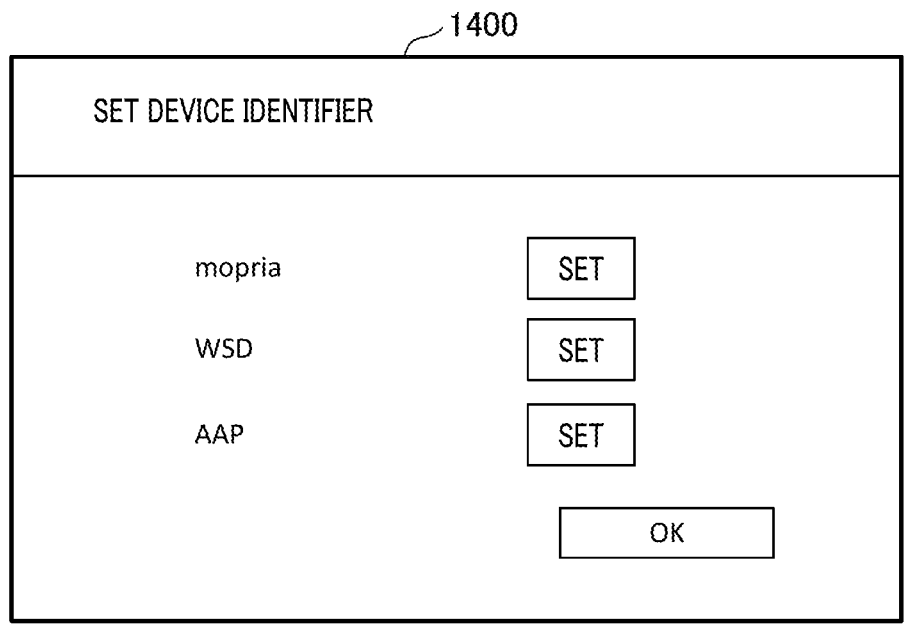
FIGS. 18A and 18B are diagrams illustrating setting screens for performing setting related to a device identifier.
Figure 18B:
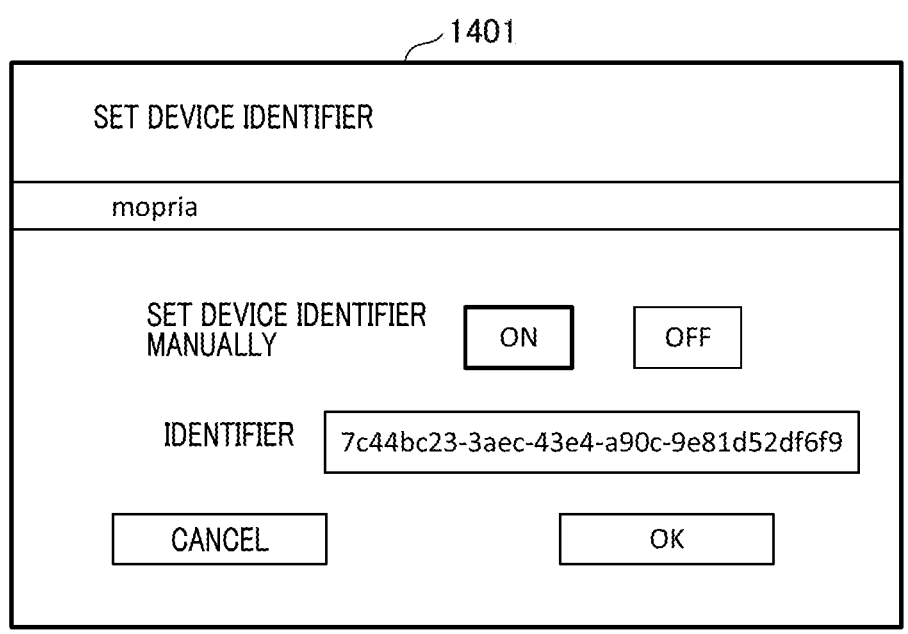

FIGS. 18A and 18B are diagrams illustrating setting screens for performing setting related to a device identifier used for the printing service according to the fifth embodiment.

As illustrated in FIG. 18A, each setting button corresponding to the printing service is displayed on a setting screen 1400. When the user pushes a certain setting button on the setting screen 1400, the control unit 1011 displays a setting screen 1401 illustrated in FIG. 18B as the setting screen corresponding to the printing service. FIG. 18B illustrates an example of a case in which setting of a device identifier allocated to mopria is selected on the setting screen 1400.

When the user turns on "Set device identifier manually" on the setting screen 1401 in FIG. 18B, the control unit 1011 selects the device identifier designated by the user. The setting of the device identifier designated by the user is also described as manual setting of device identifier below.

When the manual setting of the device identifier is selected, the user can input any text string in the field of "identifier." The control unit 1011 sets the text string input by the user as the device identifier used for the printing service.

When the user turns off "Set device identifier manually," the control unit 1011 selects setting of the device identifier used commonly to the printing services of the image forming device 101.

Thereafter, when an OK button is pushed, the setting of the device identifier is stored and reflected in the process. When a cancel button is pushed, the previous setting remains and the process is performed using the previous setting.

Figure 15:
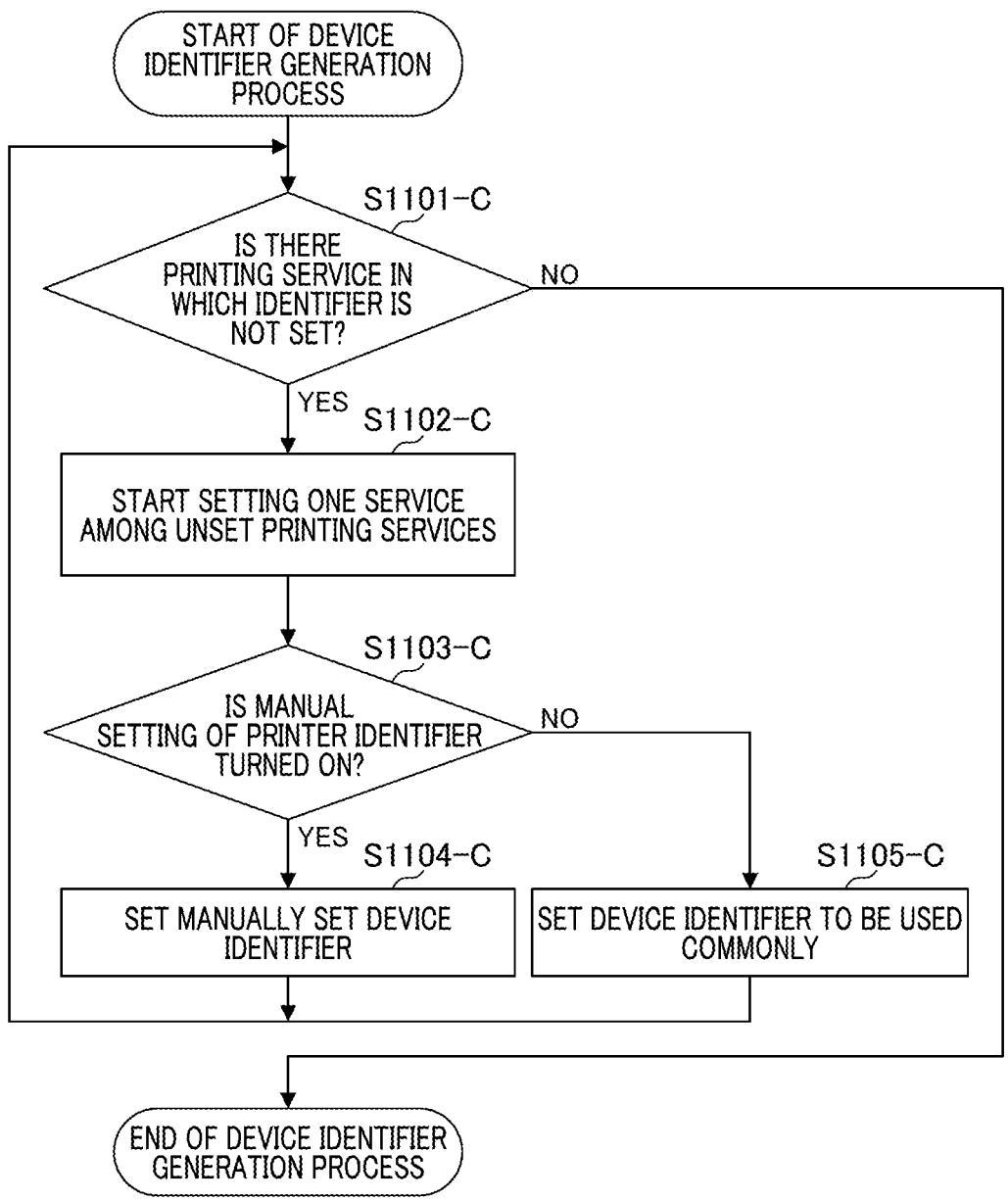
FIG. 15 is a flowchart illustrating a process of generating a device identifier.

FIG. 15 is a flowchart illustrating a process of generating a device identifier by the image forming device according to the fifth embodiment.

S1101-C and S1102-C of FIG. 15 are the same as S1101-B and S1102-B of FIG. 14B.

In S1103-C, the control unit 1011 determines whether the manual setting of the device identifier is selected. When the manual setting of the device identifier is selected, the process proceeds to S1104-C. When the manual setting of the device identifier is not selected, the process proceeds to S1105-C.

In S1104-C, the control unit 1011 sets the device identifier (UUID) designated (input) by the user on the setting screen 1401 in FIG. 18B. Then, the process returns to S1101-C.

Conversely, in S1105-C, the control unit 1011 sets the device identifier used commonly to a processing target printing service. Then, the process returns to S1101-C. The device identifier used commonly may be generated in advance or may be generated in S1105-C.

Figure 19:
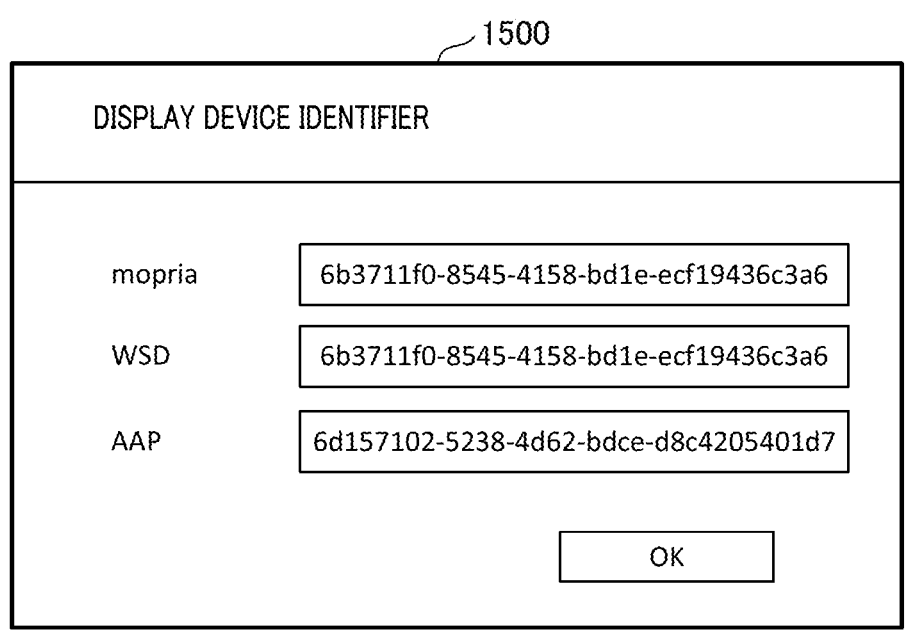
FIG. 19 is a diagram illustrating an example of a display screen of a device identifier.

FIG. 19 is a diagram illustrating an example of a display screen of a device identifier. On a display screen 1500, the device identifier (UUID) allocated to the image forming device 101 is displayed for each printing service which can be supplied by the image forming device 101.

The display screen 1500 illustrated in FIG. 19 may also be displayed in the third and fourth embodiment.

In the foregoing embodiments, WSD, mopria and Airprint have been exemplified as examples of the printing services, but printing services other than these printing services may be used in the present invention. In each embodiment, the UUID is used as the device identifier, but a device identifier other than the UUID may be used. In the present invention, the plurality of above-described embodiments may be combined and applied arbitrarily.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-201903 filed Oct. 26, 2018, which is hereby incorporated by reference herein in its entirety.

What is claimed is:

1. A control method for a device searched for by an external terminal, the method comprising:
   transmitting a first response when a searching request using a first searching protocol is received from the external terminal;
   transmitting a second response when a searching request using a second searching protocol different from the first searching protocol is received from the external terminal;
   setting whether the identification information for identifying the devices are differentiated between the first and second responses,
   wherein each of the first and second responses includes identification information for uniquely identifying the device, and
   wherein identification included in the first response and the second response are different, in a case where the setting for differentiating the identification information between the first and second responses is performed, and
   wherein identification information included in the first response and second response are the same, in a case where the setting for differentiating the identification information between the first and second responses is not performed.

2. The control method according to claim 1, comprising:
   storing information in which the kinds of first and second searching protocols and universally unique identifiers indicating the identification information included in the responses to the device searching are associated in a storage region that the device has, and
   determining the identification information included in the first and second responses based on the information stored in the storage region.

3. The control method according to claim 1, wherein the device is a printer that prints an image on a sheet.

4. The control method according to claim 3, wherein the first and second responses include at least the identification information for uniquely identifying the device and information indicating a supported printing service.

5. The control method according to claim 1, comprising:
   transmitting a third response when a searching request using a third searching protocol is received from the external terminal; and
   differentiating the included identification information among when the first response is transmitted, when the second response is transmitted, and when the third response is transmitted.

6. A device searched for by an external terminal, wherein the device comprises:
   at least one memory storing a set of instructions; and
   at least one processor executing the instructions stored in the at least one memory causing the information processing device to:
   transmit a first response when a searching request using a first searching protocol is received from the external terminal;
   transmit a second response when a searching request using a second searching protocol different from the first searching protocol is received from the external terminal,
   set whether the identification information for identifying the devices are differentiated between the first and second responses,
   wherein each of the first and second responses includes identification information for uniquely identifying the device, and
   wherein identification information included in the first response and the second response are different, in a case where the setting for differentiating the identification information between the first and second responses is performed, and
   wherein identification information included in the first response and second response are the same, in a case where the setting for differentiating the identification information between the first and second responses is not performed.

7. The device according to claim 6,
   wherein the instructions stored in the memory causes the information processing apparatus to
   store information in which kinds of first and second searching protocols and universally unique identifiers indicating the identification information included in the responses to the device searching are associated in a storage region that the device has, and
   determine the identification information included in the first and second responses based on the information stored in the storage region.

8. The device according to claim 6, wherein the device is a printer that prints an image on a sheet.

9. The device according to claim 8, wherein the first and second responses include at least the identification information for uniquely identifying the device and information indicating a supported printing service.

10. The device according to claim 6,
    wherein the instructions stored in the memory causes the information processing apparatus to
    transmit a third response when a searching request using a third searching protocol is received from the external terminal, and
    differentiate the included identification information among when the first response is transmitted, when the second response is transmitted, and when the third response is transmitted.

11. A non-transitory storage medium on which a computer program for making a computer execute a method for controlling a device searched for by an external device is stored, the method comprising:
    transmitting a first response when a searching request using a first searching protocol is received from the external terminal; and
    transmitting a second response when a searching request using a second searching protocol different from the first searching protocol is received from the external terminal,
    setting whether the identification information for identifying the devices are differentiated between the first and second responses,
    wherein each of the first and second responses includes identification information for uniquely identifying the device, and wherein identification included in the first response and the second response are different, in a case where the setting for differentiating the identification information between the first and second responses is performed, and wherein identification information included in the first response and second response are the same, in a case where the setting for differentiating the identification information between the first and second responses is not performed.

* * * * *